Aug. 24, 1954
F. N. MARIANI
2,687,292
WEIGHT STAPLING MACHINE
Filed Nov. 15, 1948
3 Sheets-Sheet 1
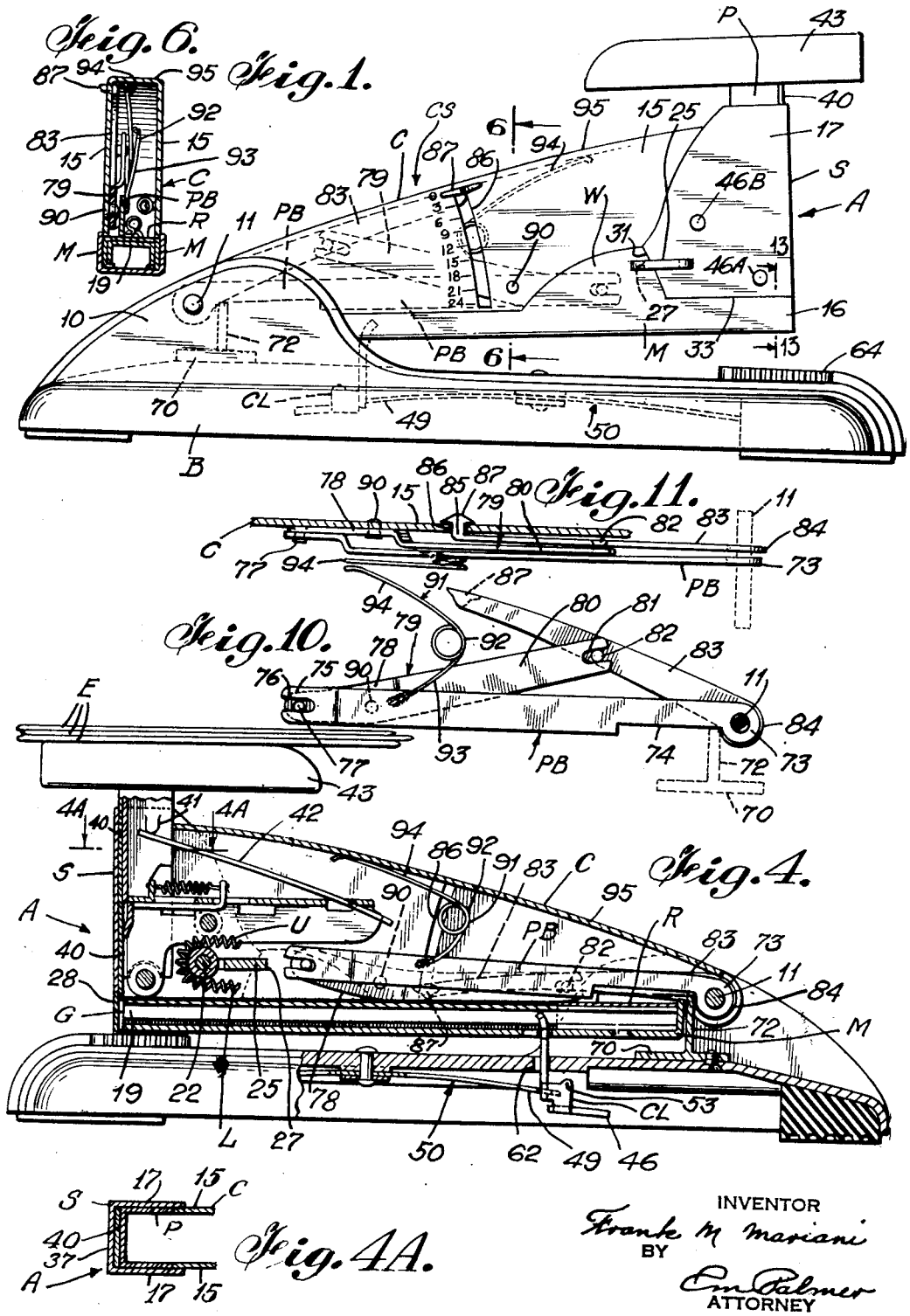
INVENTOR
Frank M. Mariani
BY
Cm Palmer
ATTORNEY

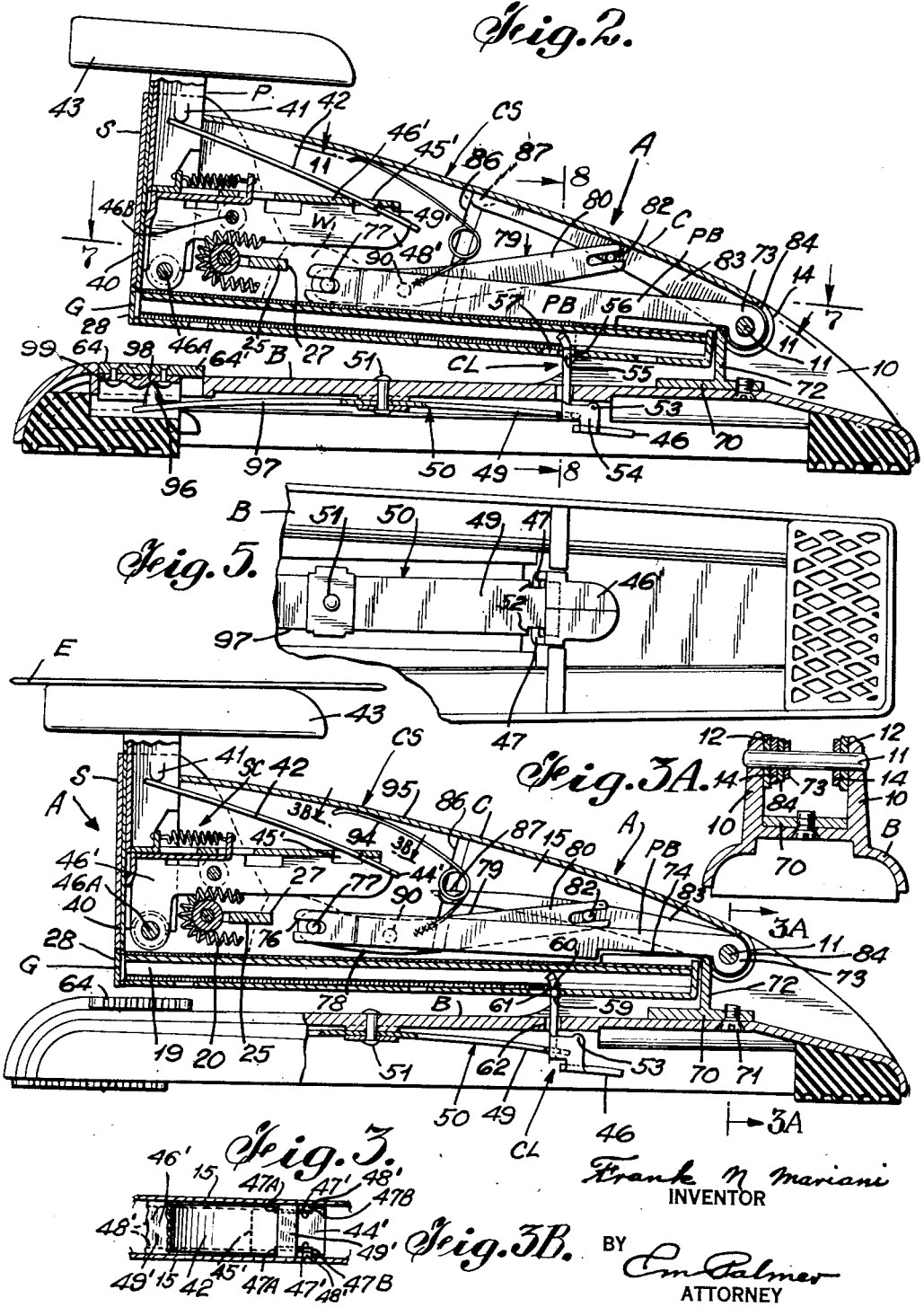

Aug. 24, 1954
F. N. MARIANI
2,687,292
WEIGHT STAPLING MACHINE
Filed Nov. 15, 1948
3 Sheets-Sheet 3
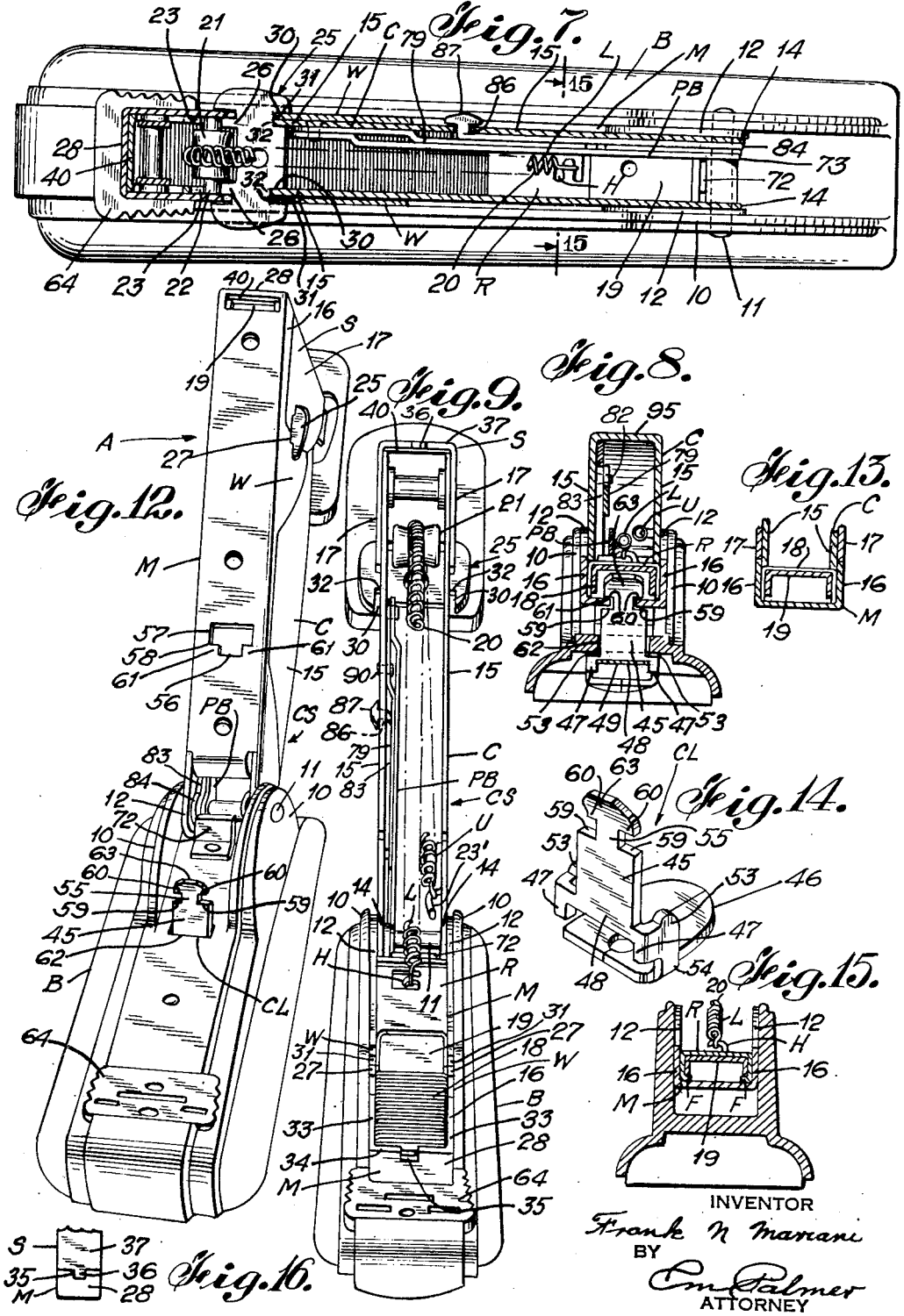
INVENTOR
Frank N Mariani
BY
Cm Palmer
ATTORNEY Patented Aug. 24, 1954

2,687,292

UNITED STATES PATENT OFFICE 2,687,292

WEIGHING STAPLING MACHINE

Frank N. Mariani, Washington Heights, N. Y.

Application November 15, 1948, Serial No. 60,059

15 Claims. (Cl. 265—27)

The invention is concerned with weighing and more particularly is directed to a novel scale continuously associated with a manually controlled stapling machine wherein a slidably guided plunger drives a staple out of a guideway and on to a clinching anvil for the purpose of stapling sheets of paper together. Generally, stapling machines of the character referred to form a convenient office appliance and the primary object of the invention is to selectively utilize such appliance for the dual purpose of stapling and weighing. Another important object is to provide a pivoted staple containing arm or beam adapted to be bodily displaced on the application of a load to be weighed on the head or platform of a slidably guided staple plunger or driver against the resistance of a load absorbing spring deflected by a load transmitting latch detachably interlocked with the pivoted beam and effectively seated on the spring. Another object is to incorporate in a stapling machine of the character referred to a weighing linkage system appropriately concealed from view and disposed within the staple containing or receiving pivoted arm which is longitudinally split to provide a staple magazine and cover therefor. Another object is to initiate the operation of the weighing linkage system upon displacement of the staple containing beam due to the load mounted on the plunger thereof. Another object is realized in mounting the load absorbing spring within the stapling machine base or support which is pivotally associated with the staple containing pivotal beam having therein a stabilizing pivoted bar of the weighing linkage system concealed within the pivoted staple housing beam but instantly accessible upon lifting of the cover of the beam away from the magazine thereof. Another object is to maintain the weighing linkage system in a neutral or zero position at a time the staple receiving arm is held fully elevated by the load absorbing spring acting on the load transmitting means, namely, the rockable and slidably guided clearing latch. Other important objects and functional and structural features of the invention will appear from the following detailed description taken with the accompanying drawings wherein:

Fig. 1 is a side view of the scale according to my invention showing the indicator at zero position at which time the pivoted staple ejecting arm of the stapling machine is fully raised or at zero weighing position.

Fig. 2 is a reverse vertical sectional view of the scale shown in Fig. 1 to illustrate the linkage system actuated upon downward displacement of the pivoted stapling ejecting arm.

Fig. 3 is a view similar to Fig. 2, showing the pivoted arm of the stapling machine partly depressed by the load to be weighed and now on the staple ejecting driver.

Fig. 3A is a transverse sectional view on the line 3A—3A of Fig. 3.

Fig. 3B is a fragmentary plan view on the line 3B—3B of Fig. 3 of the fixed mount and its companion anchored leaf spring for automatically retracting the slidable staple driver.

Fig. 4 is a view similar to Fig. 3 but with a heavier load applied to the stapling ejecting driver and showing the pivoted staple carrying arm fully depressed.

Fig. 4A is a sectional view on the line 4A—4A of Fig. 4.

Fig. 5 is a fragmentary bottom view of Fig. 2 illustrating the load absorbing leaf spring and the load transmitting tiltable clearing latch.

Fig. 6 is a transverse sectional view of the pivoted arm taken on the line 6—6 of Fig. 1.

Fig. 7 is a horizontal sectional view on the line 7—7 of Fig. 2.

Fig. 8 is a vertical sectional view on the line 8—8 of Fig. 2 illustrating the pivoted arm detachably interlocked with the load transmitting tiltable latch.

Fig. 9 is a perspective view of the scale shown in Fig. 1 but illustrating the casing or cover of the pivoted staple carrying arm swung to an opened position.

Fig. 10 is an elevational view of the linkage system for controlling displacement of the indicator lever.

Fig. 11 is a horizontal sectional view on the line 11—11 of Fig. 2.

Fig. 12 is a perspective view illustrating the pivoted staple carrying and driving arm raised and unlocked from the tiltable load transmitting latch.

Fig. 13 is a sectional view on the line 13—13 of Fig. 1.

Fig. 14 is a perspective view of the swingable load transmitting clearing latch.

Fig. 15 is a transverse sectional view on the line 15—15 of Fig. 7, and

Fig. 16 is a fragmentary front view of the lower part of the staple containing pivoted arm.

According to the invention the weighing system is embodied in a stapling machine of the type shown in United States patent to Crosby 2,424,649 which will be set out fairly briefly since such disclosure is necessary for purposes of understanding the invention, however it should be understood that the invention is not limited to this particular stapling machine which is generally referred to in the accompanying drawings and is characterized by the base B having the spaced upstanding ears 10 (Figs. 3A, 7 and 12) desirably sustaining fulcrum pin 11 on which spaced ears 12 of the swingable staple receiving magazine M are sustained. Also rotatably mounted on fulcrum pin 11 are the depending and spaced pierced ears 14 of the case C which together with the U-shaped sheath S constitute a swingable cover or casing CS for the entire length of the magazine M and in the closed relation of the latter spaced sides 15 of the cover CS removably telescope within the magazine (Fig. 13)

to be closely straddled by the spaced walls 16 of the magazine. The side walls 17 of the sheath S although secured to the sides of the case C are disposed above the sides 15, cooperating with the spaced sides 16 of the magazine to limit downward rotary displacement of the cover CS and also cooperate to limit upward displacement of staple strip 18 slidably mounted on the rail or track 19 fixed to and within the magazine M.

Runner or pusher R is appropriately slidably retained on the fixed rail 19 by the inwardly turned flanges F (Fig. 15) and is provided with hook H to which is attached the lower reach L of a normally contracted but expandible helicoidal spring 20 looped about roller 21 (Figs. 7 and 9) retained on the slidably guided pin 22 guided in slots 23 of the spaced sides 15 in the case C. The upper reach U of spring 20 is attached to hook 23' struck out of one of the sides 15 of the cover CS.

Appropriately slidably guided in the cover CS constituted as previously mentioned by the case C and sheath S is the slidable and tiltable clearing latch 25 having fingers 26 coacting to shift the pin 23 towards sheath S to remove latch 25 from the notches 27 of the spaced wings W of the magazine M. By such action the cover CS is unlocked from the magazine and hence may be swung upwardly and rearwardly to open the magazine as shown in Fig. 9. By this action also the runner is automatically pulled rearwardly, that is, away from the staple guideway G defined by the front part of the inverted U-shaped rail 19 and the front transverse wall 28 of the magazine. This raceway always receives the foremost staple of the staple strip 18 due to the action of spring 20 on runner R when the cover is closed. With the arrangement disclosed, on opening and closing cycles of the cover CS, runner R may be reciprocated towards or away from staple guideway G. If the cover be opened and swung downwardly, lugs or fingers 26 of the slidable latch 25 shift pin 22 forwardly against the resistance of spring 20 since wings W of the magazine enter notches 30 of the latch 25 (Figs. 7 and 9) thereby causing cam faces 31 of the wings W to abut walls 32 of notches 30. It follows that latch 25 is bodily and slidably displaced towards sheath S until latch 25 reaches and becomes in alinement with notches 27 of the wings W after which spring 20 automatically retracts latch 25 to interlock with the walls of notches 27 in the spaced wings W at which time also sheath S rests on the spaced top faces 33 (Figs. 1 and 9) of the sides 16 of the magazine M and on the top face 34 of the front transverse wall 28 embodying the alining notch 35 for reception of lug 36 depending from the front transverse wall 37 of sheath S.

Vertically and slidably guided between the front part of the spaced sides 15 of case C and the walls of the U-shaped sheath S (Fig. 4A) is the U-shaped plunger P carrying the staple driving blade 40. Plunger P is provided with inwardly struck lugs 41 resting on the front end of the relatively stiff leaf spring 42 which normally holds the plunger P elevated to position the lower end of the blade 40 above the staple strip and permit the foremost staple of the latter to be automatically arranged in alinement with vertical staple guideway G and to be received thereby to await a downwardly directed blow applied to the head or load receiving platform 43 suitably fastened to the plunger P whereupon blade 40 drives the foremost staple downwardly out of the magazine. It will be observed that the top surface of head 43 is straight and horizontal whereby papers or letters sealed in envelopes may be conveniently placed thereon.

The lower end of cantilever leaf spring 42 is provided with spaced notches 47' defining a T-shaped portion 44' (Fig. 3B). Portion 44' is adapted to be inserted into opening 45' of the fixed and inverted U-shaped mount 46' whereby walls 47A and 47B of notches 47 in spring 42 straddle and interlock with spaced side portions 48' depending from web 49' of the mount, thus desirably anchoring spring 42 in place against longitudinal and transverse displacement. Mount 46' is held fixedly and effectively in place as shown in Fig. 2 on pins 46A and 46B retained by the side walls of sheath S and the case C.

For purposes of specification, the magazine and cover therefor may be considered as a staple containing an ejecting arm or beam broadly denoted A pivotally sustained on the fulcrum pin 11 but this arm in effect is a cantilever beam or primary load transmitting means. If therefore a load be applied to cap or platform 43, arm A tilts downwardly for actuating a tiltable and slidably guided secondary load transmitting clearing latch generally designated CL in the form of a bell crank lever having the vertical component 45 and the horizontal component or manipulator 46. Component 45 embodies lips 47 bridged by the flat bottom breast 48 seated on rear end 49 of the flat leaf spring 50 secured to the base B by rivet 51. More specifically lips 47 are loosely disposed in notches 52 (Fig. 5) of end 49 of spring 50 and the arcuate ears or lobes 53 extending upwardly from wings 54 are adapted to bear against the underface of the base B which serves as fulcrum means (Fig. 2).

With lips 47 within notches 52, clearing latch CL may be tilted or rocked by applying an inwardly directed thrust on manipulator 46. This action causes breast 48 to flex end 49 downwardly at which time component 45 swings in a direction towards the guideway whereby web or neck 55 (Figs. 2, 12 and 14) of component 45 is moved out of the reduced opening 56 and into the communicating expanded relief opening 57 of the compound opening 58 in the bottom wall of the magazine M, thus unlocking or removing the spaced lower and upper shoulders 59 and 60 from the cooperating shoulders or lips 61 of the magazine. Consequently the magazine M of arm A may be quickly detached or unlocked from the clearing latch CL. Of course component 45 is slidably but loosely guided in slot 62 in the base B.

To lock the magazine to the clearing or load transmitting latch CL, the magazine is swung downwardly, causing abutment lips 61 to first strike the inclined head or cam 63 of component 45, thus tilting the latter against resistance of spring component 49 towards the slidably guided staple clearing anvil 64 until shoulders 60 ride above lips 61 in which case, end 49 of the spring 50 automatically retracts component 45 whereby shoulders 59 and 60 again straddle and interlock with the abutment lips 61 of the magazine, thereby disengageably locking the latter and such is maintained by end 49 at which time ears 53 (Fig. 2) yieldingly bear against base B.

With the magazine detachably interlocked with load transmitting tiltable latch CL, the latter may be still vertically displaced by the abutment lips 61 acting on the lower shoulders 59. This takes place when a load as E is mounted on platform 43 thereby causing arm A to tilt downwardly. Since breast 48 of latch CL is seated on spring end or complement 49, the latter is flexed from the neutral or no load position shown in Fig. 2 to that shown in Fig. 3. Thus the latch CL is vertically displaced downwardly and ears 53 leave base B. Spring complement 49, which in effect is a cantilever will be further flexed or deflected (Fig. 4) upon application of a heavier load such as three envelopes E on platform 43 causing further downward pivotal displacement of arm A relative to base B.

Upon removal of the load from the platform, spring complement 49 urges and lifts breast 48 of latch CL upwardly, whereupon lower shoulders 59 elevate abutment lips 61 and consequently the magazine M to its normal or no load position (Fig. 2) and such relation is maintained by spring complement 49.

Of interest is the bracket 70 (Fig. 3) secured to rear part of the base by the screw 71. This bracket has an upstanding lug 72, serving as a support or seat for the pivoted stabilizing bar PB having its rear end in the form of an ear 73 pivoted on fulcrum pin 11 sustained of course at the rear of the base. More particularly the straight face 74 (Fig. 10) of bar PB rests on the fixed lug or seat 72. The other or front end of the stabilizing bar PB is offset as shown in Fig. 11 and is provided with guide slot 76 defining a fork or bearing having upper and lower walls operatively straddling pin 77 fixed to the lower component 78 of the driven bell crank or link broadly indicated 79 having its upper component 80 bifurcated, that is provided with slot 81 with its upper and lower walls movably straddling pin or post 82 fixed to the swingable lever or indicator arm 83 having ear 84 also pivoted on the fulcrum pin 11.

Offset terminal portion 85 extends laterally of the body of lever 83 and is integral therewith although movably guided in the arcuate slot or track means 86 interrupting one side wall 15 of the case C. Terminal portion 85 is provided with a pointed head 87 cooperating with certain indicia on the adjacent wall 15, for example, the indicia ranging from 6–24 to determine the displacement or arcuate deflection of the indicating lever 83 which translates the extent of the deflection of spring component 49 due to the load applied to platform 43.

Of special significance is driving pin 90 which is fixedly fastened to one of the sides 15 of the case C (Figs. 6 and 11). This pin 90 pivotally sustains complement 78 of the offset link or elbow 79. Therefore movement of the case C causes link 79 to be similarly displaced relative to the stabilizing bar PB. Since link 79 drives the pivoted lever 83 through the pin and slot connection 81 and 82, lever 83 is also pivotally displaced relative to the case C.

For normally holding bar PB against seat 72, a spring broadly indicated 91 is provided. This spring has an intermediate coiled portion 92 from which extends the lower arm 93 which is spot welded to the pivoted bar PB to hold latter against the fixed seat 72. Arm 94 also extends from the coiled portion 92 and abuts top transverse wall 95 of case C.

By reason of spring 91, stabilizing bar PB always remains stationary relative to base B on all weighing operations and this also holds true upon retraction of the beam or arm A after the weighed load is removed from platform 43.

Normally clearing latch CL holds the magazine M in the elevated position shown in Fig. 2 in which case the slidably guided plunger or driver P of which platform 43 is a part is also fully raised by spring 42 so that staple driving blade 40 is just slightly above the staple strip 18. In this relation if a load E be applied to the head or platform 43, arm A tilts downwardly and relative to the pivoted bar PB, causing lips 61 (Fig. 8) to abut lower shoulders 59, thereby downwardly displacing the clearing latch CL and therefore deflecting spring component 49 (Fig. 3A) wherein ears 53 have moved away from the underface of base B. In the event that the load be increased, for example, if the three envelopes E are placed on the platform 49 (Fig. 4), spring component 49 has been further flexed proportionately.

As the arm A is pivoting downwardly due to the load applied to platform 43, pin 90 fastened to case C is correspondingly displaced, consequently link 79 is tilted downwardly and since the latter actuates the pivoted indicator arm 83, pointer 87 is displaced in proportion to the weight of the load on the platform, the graduation marks (such as 0, 3, 6, 9, 12 etc.) on the adjacent facing side wall 15 of the case C (Fig. 1) showing the extent of displacement of pointer 87. For example, the graduation marks may denote the amount of postage to be applied or the weight of the load on the platform. Upon removal of the load, arm A is pivotally restored to its normal or zero position due to release of energy or recoil of the load receiving cantilever leaf spring component 49. Of course also at this time indicator arm 83 likewise returns to its normal elevated position due to the action of the divergent spring arms or members 93 and 94 which act also as previously stated to hold bar PB on seat 72.

Where access is desired to the weighing linkage system constituted by the stabilizing bar PB, link 79, and indicator element or lever 83, the cover CS may be swung upwardly (Fig. 9) only after slidable latch 25 has been shifted forwardly to be free of or unlocked from the upstanding wings W of the magazine.

Prior to weighing it may be desirable to effectively hold the envelopes E closed and this may be accomplished by placing same severally on the staple clinching anvil 64, and thereafter applying a downwardly directed blow on the platform or cap of the plunger or driver P and by such action blade 40 of the latter forces the foremost staple of strip 18 through guideway G, through the envelope and against the clinching anvil 64 where the legs of the driven staple are effectively bent to seal the envelope. The anvil is held in place by projection 96 extending upwardly from the front spring component 97 forming also a part of leaf spring 50, and this projection is adapted to snap into a suitable indent as 98 of a suitably slidably guided channeled member 99 fastened to the anvil 64 (Fig. 2).

Briefly recapitulating the staple containing pivoted arm or beam A is normally removably seated on and interlocked with the clearing latch CL which transmits the intensity of the load applied to the platform 43 to the load absorbing cantilever spring component 49 and the pointer 87 is deflected downwardly in proportion to the deflection of spring component 49. However operation of the linkage system takes place when the arm or beam A has been pivoted downwardly. On such pivotal displacement the driving pin 90 initiates the operation of the linkage system, causing elbow or intervening connector 79 to be pivoted downwardly, thereby lowering the indicating lever 83. On such downward pivotal movement of beam A, it is important to observe, that pivoted bar PB remains stationary as the magazine M and the cover CS bodily move downwardly relative to the bar PB and base B but even though bar PB remains on seat 72 the control pin 90 displaces the connector or elbow 79 relative to the bar PB and of course lever 83 is actuated accordingly relative to the now stationary bar PB. It is only when the cover CS is unlocked from the magazine and swung rearwardly relative to the latter that the bar PB swings bodily with the cover.

Where no load is applied to the platform 43 of the driver or plunger P and it is desired to drive and expel a staple, a manually directed blow is applied to platform 43. Thus the driver or plunger P is depressed against the resistance of the cantilever leaf spring 42 and blade 40 drives the foremost staple out of the magazine for clinching purposes. In such case, arm or beam A also pivots downwardly, driving the clearing latch CL linearly downwardly to deflect or flex spring component 49 but also in such event the linkage system operates and consequently lever 83 is tilted downwardly. However such operation is purely idle in character as at this time no reading of the weight of the load is required.

Concerning the seat or support 72 the latter is at the rear and outside of the magazine M although adjacent ears 73 and 84 (Fig. 4) of the stationary bar PB and lever 83, however without interfering with the rotation of these ears when the cover CS is rotated relative to magazine M in the matter of opening or closing of the cover after having been unlocked by slidable latch 25.

Leaf spring 42 holds the plunger or driver P against stop lugs 41 projecting from the sides thereof and may be although not necessarily of such strength to resist slidable displacement of the plunger due to a load to be weighed and placed on the platform. Compared to the stiffness of the cantilever leaf springs 42 and 49, spring 91 is relatively weak and serves not only to hold bar PB on support 72 at all times during weighing operations and during automatic retraction of arm A thereafter but also serves to elevate indicator lever 83 to the zero position of course after the load is removed from platform 43. If spring 91 be removed, the linkage system would collapse and thus bar PB would move bodily with arm A or in other words the weighing system would become disabled but this is prevented by the action of spring 91 acting on bar PB which by reason of the lower fork caused in forming slot 76 guards or retains pins 77 against vertical displacement even though link 79 is driven by pin 90.

Various changes may be made in the details of construction and arrangement of parts without departing from the spirit of the invention or sacrificing any of the advantages thereof inherent therein.

I claim:

1. In a weighing appliance adapted to be embodied in a stapling machine wherein a staple carrying arm is pivoted at one end to a base and wherein a staple ejecting plunger is slidably carried at an opposite end of said arm; a platform mounted on said plunger and adapted to receive a load to be weighed, linkage means within said arm, indicator means, and means responsive to the weight of said load for tilting said arm towards said base and for actuating said linkage means for displacing said indicator means relative to said arm.

2. In a weighing appliance, a base, a beam having a load receiving platform, means pivotally sustaining said beam at one end thereof on said base, load transmitting means having means supporting said beam intermediate the ends thereof, spring means carried by said base for yieldingly sustaining said load transmitting means for normally holding the latter elevated and adapted to be flexed upon downward pivotal displacement of said beam relative to said base due to a load mounted on said platform, stabilizing means having one terminal pivoted on said means pivotally sustaining said beam, indicator means, driving means carried by said beam, a seat secured to said base and coacting to support said stabilizing means adjacent said terminal against downward movement, spring means coacting with said beam and stabilizing means for maintaining the latter stationary and bearing against said seat during said downward pivotal displacement, and means actuated by said driving means on said downward pivotal displacement for shifting said indicator means relative to said beam.

3. In a weighing appliance, a base, a beam having a load receiving platform, means pivotally sustaining said beam at one end thereof on said base, load transmitting means having means supporting said beam, a cantilever leaf spring carried by said base for sustaining said load transmitting means for normally holding the latter elevated and adapted to be flexed upon downward pivotal displacement of said beam relative to said base due to a load mounted on said platform, a stabilizing bar having one terminal pivoted on said means pivotally sustaining said beam, indicator means, driving means carried by said beam, a seat secured to said base and coacting to support said stabilizing bar forwardly of and adjacent said terminal against downward movement, spring means coacting with said beam and bar for maintaining said stabilizing bar stationary and bearing against said seat during said downward pivotal displacement and against the resistance of said leaf spring on shifting of said indicator means relative to said beam.

4. In a weighing appliance, a base, a beam having a load receiving platform, means pivotally sustaining said beam at one end thereof on said base, a latch having means detachably supporting said beam, a cantilever leaf spring carried by said base for sustaining said latch for normally holding the latter elevated and adapted to be flexed upon downward pivotal displacement of said beam relative to said base due to a load mounted on said platform, a stabilizing bar having one terminal pivoted on said means pivotally sustaining said beam, indicator means, driving means bodily movable with said beam, a seat secured to said base and coacting to removably support said stabilizing bar forwardly of and adjacent said terminal against downward pivotal movement, spring means having diverging means coacting with said beam and bar for maintaining the latter stationary and bearing against said seat during said downward pivotal displacement, and means operatively interconnecting said bar and indicator means and actuated by said driving means on said downward pivotal displacement and against the resistance of said leaf spring for shifting said indicator means relative to said beam.

5. In a weighing appliance adapted to be embodied in a stapling machine wherein a staple carrying arm is pivoted at one end to a base; a platform mounted at the opposite end of said arm and adapted to receive a load to be weighed, stabilizing means within said arm, means maintaining said stabilizing means stationary relative to said base, a link tiltable relative to said stabilizing means, indicator means pivoted relative to said arm, load transmitting means supporting said arm intermediate the ends thereof, a load absorbing spring sustained by said base for normally holding said load transmitting means elevated, and driving means for displacing said link upon downward pivotal displacement of said arm relative to said stabilizing means and against the resistance imparted by said spring to said load transmitting means to shift said indicator means relative to said arm.

6. In a weighing appliance adapted to be embodied in a stapling machine wherein a staple carrying arm is pivoted at one end to a base; a platform mounted at the opposite end of said arm and adapted to receive a load to be weighed, stabilizing means within said arm, spring means maintaining said stabilizing means stationary relative to said base, a link tiltable relative to said stabilizing means, indicator means pivoted relative to said arm, load transmitting means supporting said arm intermediate the ends thereof, a load absorbing spring for normally holding said load transmitting means elevated, and driving means for displacing said link upon downward pivotal displacement of said arm relative to said stabilizing means and against the resistance imparted by said spring to said load transmitting means to shift said indicator means relative to said arm.

7. In a weighing appliance adapted to be embodied in a stapling machine wherein a staple carrying arm is pivoted at one end to a base; a platform mounted at the opposite end of said arm and adapted to receive a load to be weighed, stabilizing means within said arm, means maintaining said stabilizing means stationary relative to said base, a link tiltable relative to said stabilizing means, indicator means pivoted relative to said arm at said first mentioned end, a latch removably interlocking with and supporting said arm intermediate the ends thereof, a load absorbing leaf spring connected to said base for normally holding said load transmitting means elevated, and driving means for displacing said link upon downward pivotal displacement of said arm relative to said stabilizing means and against the resistance imparted by said spring to said load transmitting means to shift said indicator means relative to said arm.

8. In a weighing appliance adapted to be embodied in a stapling machine wherein a staple carrying arm is pivoted at one end to a base; a platform mounted at the opposite end of said arm and adapted to receive a load to be weighed, stabilizing means within said arm, means maintaining said stabilizing means stationary relative to said base, a bell crank lever pivoted on said stabilizing means, indicator means pivoted relative to said arm at said first mentioned end, load transmitting means supporting said arm intermediate the ends thereof, a load absorbing cantilever spring connected to said base for normally holding said load transmitting means elevated, and pin means bodily movable with said arm for displacing said link upon downward pivotal displacement of said arm relative to said stabilizing means and against the resistance imparted by said spring to said load transmitting means to shift said indicator means relative to said arm.

9. In a weighing appliance adapted to be embodied in a stapling machine wherein a staple carrying arm is pivoted at one end to a base; a platform mounted at the opposite end of said arm and adapted to receive a load to be weighed, stabilizing means within said arm, means within and outside of said arm maintaining said stabilizing means stationary relative to said base, a link tiltable relative to said stabilizing means, indicator means pivoted relative to said arm, slidable and pivoted load transmitting means supporting said arm intermediate the ends thereof, a load absorbing leaf spring carried by said base for normally holding said load transmitting means elevated and in part yieldingly against said base, and driving means for displacing said link upon downward pivotal displacement of said arm relative to said stabilizing means and against the resistance imparted by said spring to said load transmitting means to shift said indicator means relative to said arm.

10. In a weighing appliance adapted to be embodied in a stapling machine wherein a staple carrying arm having spaced indicia is pivoted on fulcrum means at the rear end of a base and wherein a staple ejecting plunger is slidably carried at the front end of said arm; a platform mounted on said plunger and adapted to receive a load to be weighed, a stabilizing bar pivoted on said fulcrum means, a support extending from said base for seating said bar, an indicating lever pivoted on said fulcrum means, a link having a loose driving connection with said lever and a loose connection with said stabilizing bar, spring means to hold said stabilizing bar against said support on tiltable displacement of said arm relative to said base, a latch movably guided and in part extending through said base and having means supporting said arm intermediate the ends thereof, a cantilever leaf spring secured to said base for normally holding said latch elevated and yieldingly against said base, and driving means connecting said arm and link for actuating the latter upon downward pivotal displacement of said arm relative to said stabilizing bar and against the resistance imparted by said spring to said latch to shift said lever relative to said indicia.

11. In a weighing appliance adapted to be embodied in a stapling machine wherein a staple carrying arm having spaced indicia is pivoted on fulcrum means at the rear end of a base and wherein a staple ejecting plunger is slidably carried at the front end of said arm; a platform mounted on said plunger and adapted to receive a load to be weighed, a stabilizing bar pivoted on said fulcrum means, a support mounted on said base for seating said bar, an indicating lever pivoted on said fulcrum means, a link having a loose driving connection with said lever and a loose connection with said stabilizing bar, relatively weak spring means coacting with said arm and stabilizing bar to hold the latter stationary against said support on tiltable displacement of said arm relative to said base, a latch extending through said base and having spaced upper and lower shoulders detachably interlocking and in part constituting means for supporting said arm intermediate the ends thereof, a relatively stiff cantilever leaf spring secured to said base for normally holding said latch elevated and yieldingly against said base and for automatically retracting said arm pursuant to downward pivotal displacement, means connecting said arm and link for actuating the latter upon downward pivotal displacement of said arm relative to said stabilizing bar and against the resistance imparted by said spring to said latch to shift said lever relative to said indicia, and a relatively stiff leaf spring coacting with said plunger for holding the latter elevated.

12. In a weighing appliance adapted to be embodied in a stapling machine wherein a staple and indicia carrying arm is characterized by a magazine having an opening and spaced lips and a swingable cover both pivoted at the rear end thereof on fulcrum means at the rear end of a base and wherein a staple ejecting plunger is slidably carried at the front end of said cover and wherein latch means detachably locks said cover to said magazine; a platform mounted on said plunger and adapted to receive a load to be weighed, a stabilizing bar pivoted on said fulcrum means, a support on said base for seating said bar, an indicating lever pivoted on said fulcrum means, a tiltable link having a loose driving connection with said lever and a loose connection with said bar, spring means having spaced resilient members coacting with said arm and bar to hold the latter against said support on tiltable displacement of said arm relative to said base, a latch tiltable relative to and extending through said base and having spaced means detachably interlocking with said lips and for supporting said arm intermediate the ends thereof and including spaced wings having ears, a cantilever leaf spring secured to said base and tiltably sustaining said latch and normally holding the latter elevated and said ears yieldingly pivoted against said base and for automatically retracting said arm pursuant to downward pivotal displacement, and driving means connecting said arm and link for actuating the latter upon downward pivotal displacement of said arm relative to said bar and to shift said lever relative to said indicia and against the resistance imparted by said spring to said latch, said resilient members automatically retracting said lever to a neutral indicating position pursuant to removal of said load from said platform.

13. In a weighing appliance, a staple carrying arm provided with an indicia carrying wall having an arcuate slot and having at the front end thereof a staple ejecting slidable plunger, a base having fulcrum means at the rear end thereof for pivotally sustaining said arm, a platform mounted on said plunger and adapted to receive a load to be weighed, a stabilizing bar pivoted on said fulcrum means, a support carried by said base for seating said bar, an indicating lever pivoted on said fulcrum means and having offset means movably guided in said slot, a link including an upper part having a loose driving connection with said lever and having a lower part embodying a connection with said bar loose against vertical displacement, spring means coacting with said arm and stabilizing means to hold the latter against said support on tiltable displacement of said arm relative to said base, a latch extending through said base and having spaced means for supporting said arm intermediate the ends thereof, a cantilever leaf spring secured to said base for normally holding said latch elevated and yieldingly against said base, and driving means pivotally connecting said arm and link for actuating the latter upon downward pivotal displacement of said arm relative to said bar and against the resistance imparted by said spring to said latch to shift said lever and offset means relative to said indicia.

14. In a weighing appliance, a staple carrying arm provided with an indicia carrying wall having an arcuate slot and having at the front end thereof a staple ejecting slidable plunger, a base having fulcrum means at the rear end thereof for pivotally sustaining said arm, a platform mounted on said plunger and adapted to receive a load to be weighed, a stabilizing bar pivoted on said fulcrum means, a support extending from said base for seating said bar, an indicating lever pivoted on said fulcrum means and having offset means movably guided in said slot, a link having a loose driving connection with said lever and a loose connection with said bar, spring means to hold said bar against said support on tiltable displacement of said arm relative to said base, a latch having a part extending through said base and having spaced means for supporting said arm intermediate the ends thereof, said base having means for movably guiding said part, a cantilever leaf spring secured to said base for normally holding said latch elevated and yieldingly against said base, and driving means extending from said arm pivotally sustaining and driving said link for actuating the latter upon downward pivotal displacement of said arm relative to said bar and against the resistance imparted by said spring to said latch to shift said lever and offset means relative to said indicia.

15. In a weighing appliance, a staple carrying arm provided with an indicia carrying wall having an arcuate slot and having at the front end thereof a staple ejecting sliding plunger, a base having fulcrum means at the rear end thereof for pivotally sustaining said plunger, a platform mounted on said arm and adapted to receive a load to be weighed, a stabilizing bar pivoted on said fulcrum means, means mounted on said appliance serving as a seat for said bar, an indicating lever pivoted on said fulcrum means and having means guided in said slot, a link having a loose driving connection with said lever and a loose connection with said bar, spring means to hold said bar against said seat on tiltable displacement of said arm relative to said base, a latch movably guided by said base and having spaced means for supporting said arm intermediate the ends thereof, a cantilever leaf spring secured to said base for normally holding said latch elevated and yieldingly against said base, and driving means pivotally connecting said arm and link for actuating the latter to shift said lever relative to said indicia upon downward pivotal displacement of said arm relative to said bar and against the resistance imparted by said spring to said latch.

References Cited in the file of this patent

UNITED STATES PATENTS

| Number | Name | Date |
| --- | --- | --- |
| 66,524 | Shaler | July 8, 1867 |
| 659,292 | Culmer | Oct. 9, 1900 |
| 1,946,775 | Zwickl | Feb. 13, 1934 |
| 2,036,637 | Kingsbury | Apr. 7, 1936 |
| 2,069,499 | Marin | Feb. 2, 1937 |
| 2,236,158 | Rockefeller | Mar. 25, 1941 |
| 2,412,270 | Johnston | Dec. 10, 1946 |
| 2,424,649 | Crosby | July 29, 1947 |
| 2,560,945 | Goldberger | July 17, 1951 |